Sept. 13, 1966    T. BUDZICH    3,272,277
SYNCHRONIZATION OF FLUID POWER DRIVES
Filed April 20, 1964    3 Sheets-Sheet 1

INVENTOR
TADEUSZ BUDZICH
BY William N. Hogg
ATTORNEY

Sept. 13, 1966     T. BUDZICH     3,272,277

SYNCHRONIZATION OF FLUID POWER DRIVES

Filed April 20, 1964     3 Sheets-Sheet 2

INVENTOR
TADEUSZ BUDZICH
BY William N. Hogg
ATTORNEY

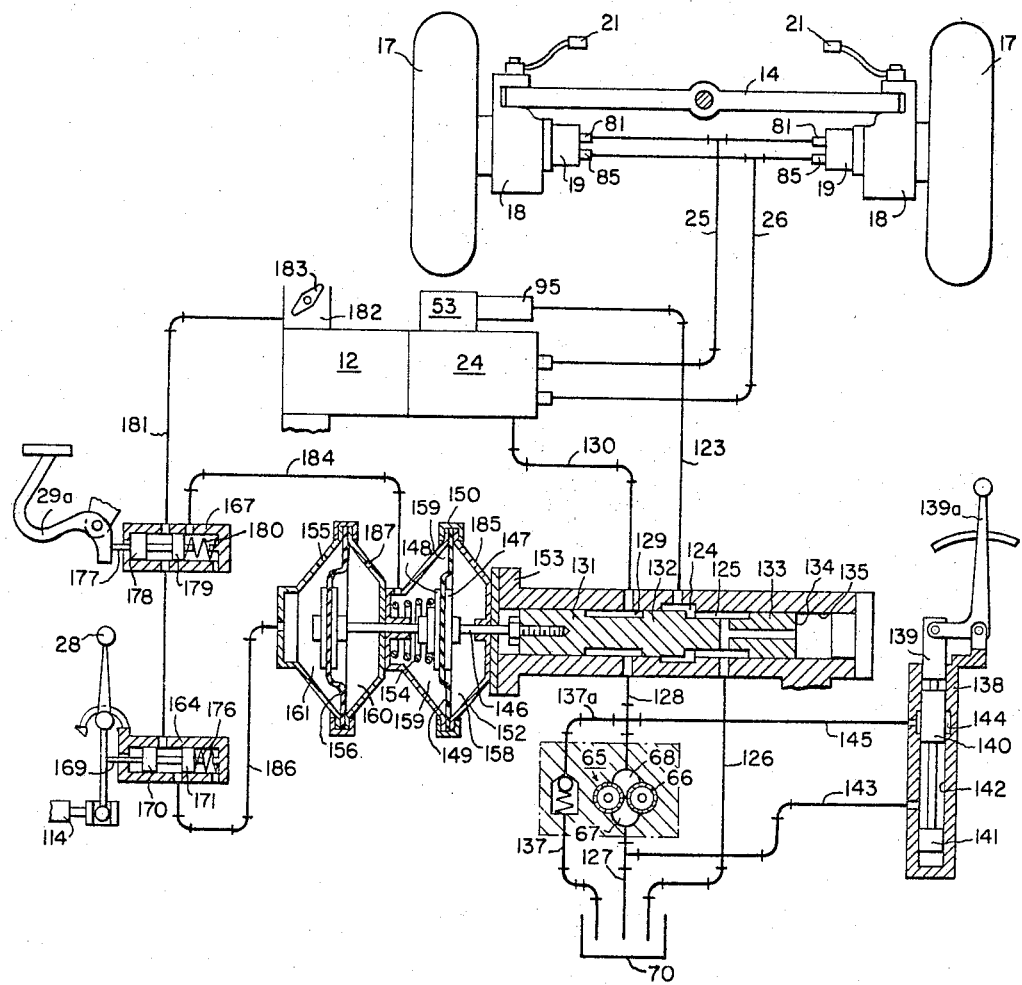

3,272,277
SYNCHRONIZATION OF FLUID POWER DRIVES
Tadeusz Budzich, 3344 Colwyn Road, Cleveland, Ohio
Filed Apr. 20, 1964, Ser. No. 360,905
12 Claims. (Cl. 180—44)

This invention relates generally to power drives of self-propelled vehicles, and more particularly to front axle fluid power drives of tractors, self-propelled farm machinery and earth-moving equipment.

In still more particular aspects, this invention relates to front axle fluid power drives which are synchronized through gear shifts and clutches by variable flow pump means equipped with an automatic pressure responsive control.

Fluid power drives employing a variable flow pump, equipped with automatic pressure responsive controls which vary the pump flow to maintain a constant system pressure disposed to operate fluid motors, drivingly engaging steering wheels of the vehicle and mounted on the wheels, will display the following characteristics: with the engine working and the pump supplying fluid at constant pressure to the fluid motors, a constant torque will be developed at the steering wheels with the vehicle stationary or travelling in a speed range within the maximum capacity of the variable flow pump. This constant torque will supplement the torque transmitted from the engine through the conventional mechanical transmission to the driving wheels. In this combination, both the mechanical and fluid drives will remain in a state of complete synchronization.

The unique characteristic of this type of front axle fluid drive, namely the ability to maintain a constant uninterrupted torque at the front wheels, although beneficial from the drive synchronization standpoint, produces the following parasitic effects. First, the conventional gear shift and clutch combination, provided to change the drive ratio of the mechanical transmission, can work satisfactorily only when no driving torque is supplied to the vehicle wheels. The gear boxes of tractors are usually unsynchronized, making gear shifting, with the tractor in motion, very difficult. Second, when the tractor gear shift lever is in neutral and therefore the idling engine is effectively disconnected from the driving wheels, a constant torque at the front wheels, supplied from fluid drive, will tend to sustain the motion of the vehicle. Under those conditions, when stopping or parking, full brakes must be continuously applied to prevent creep of the vehicle. This not only complicates the control of the vehicle, but also introduces the substantial hazard of a run-away vehicle. Third, since the fluid and mechanical drives of the tractor are synchronized with each other by the surface of the ground and their driving relationship in respect to the engine, actuation of the tractor clutch will disconnect tractor driving wheels from the engine, thus completely upsetting drive synchronization. Under those conditions the front wheel drive will automatically take over, trying to accelerate the tractor to its maximum speed. Since actuation of the tractor clutch normally signifies changing of the gears, this effect is especially detrimental since it makes, without application of the brakes, gear shifting very difficult. Therefore, to ensure satisfactory operation of the drive, the fluid transmission system must be made inactive during actuation of the tractor clutch and when tractor mechanical transmission is shifted into neutral position.

It is therefore a principal object of this invention to provide for synchronization of a fluid drive unloading mechanism with conventional controls of the mechanical transmission of a tractor.

Another object of this invention is to provide a synchronizing mechanism between fluid drive controls and mechanical transmission controls to integrate the functions of both drives for optimum safety and ease of operation.

A further object of this invention is to provide controls for a fluid drive unloading mechanism which will make the fluid drive inactive when the mechanical transmission is shifted into neutral position and which will activate the fluid drive with mechanical transmission shifted into a driving gear range.

An additional object of this invention is to provide a control for a fluid drive unloading mechanism which will make the fluid drive inactive when the clutch disengages the engine from the driving wheels and which will activate the fluid drive with the clutch drivingly connecting engine to the driving wheels.

Still a further object of this invention is to provide a fluid drive reversing mechanism and control which will reverse the fluid drive when the gear shift lever of the mechanical transmission is moved into reverse gear position.

Still another object of this invention is to provide a mechanism for synchronizing the reversing controls of a fluid drive with the reversing controls of a mechanical transmission which will permit the reversal of the fluid drive only under condition of zero pump flow and minimum pump pressure, thus permitting reversal of the fluid drive with minimum shock.

Yet a further object of this invention is to provide an independent control for a fluid drive unloading mechanism which, once actuated, will unload the fluid drive and make it independent from mechanical transmission controls of the tractor.

Further objects and advantages will become apparent from the following description taken in conjunction with the drawings in which:

FIG. 5 is a diagrammatic representation of a vacuum control circuit according to this invention for synchronizing mechanical transmission controls of a tractor with the front wheel fluid drive.

Figure 1:
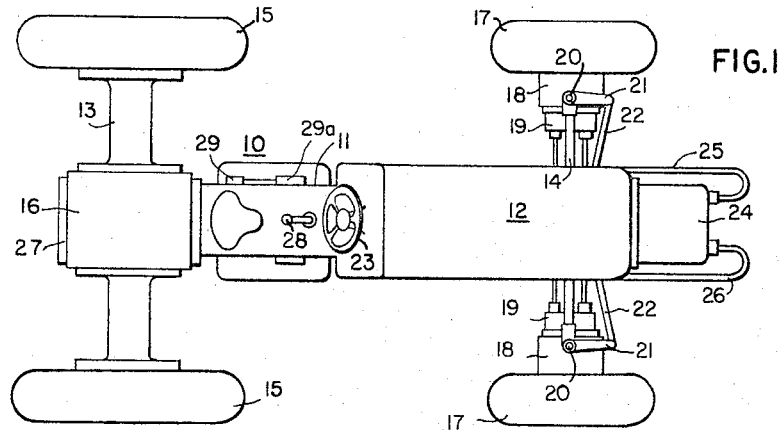
FIGURE 1 is a plan view, somewhat diagrammatic, of a tractor showing the mounting of the fluid drive and tractor controls incorporated in this invention.

Referring now to the drawings, and particularly to FIG. 1, a tractor generally designated as 10 is shown having a frame 11 mounting an engine 12, a back axle 13 and a front axle 14. The tractor is provided with rear wheels 15 mounted on the back axle 13, the wheels being drivingly connected with engine 12 through a mechanical transmission 16. Steering front wheels 17 are provided and equipped with mechanical gear reductions 18 mounting fluid motors 19, each disposed to drive one of the front wheels 17 in a manner to be described presently. Each combination of front steering wheel 17, gear reduction 18 and fluid motor 19 is pivotally mounted by a kingpin 20 on the front axle 14. A conventional steering arm 21, through a tie rod 22, connects the front steering wheels 17 to tractor steering wheel 23. A variable flow pump generally designated as 24 is driven by engine 12 and connected through flexible ducts 25 and 26 to each of the fluid motors 19. As shown in FIG.

1, the variable flow pump 24 is directly mounted on the engine, although it can be mounted on a pad of the mechanical transmission 16 or at any suitable power take-off location. The drive ratio of the mechanical transmission 16 is altered in a conventional manner by gear shift lever 28 operated in conjunction with tractor clutch 29 which includes tractor clutch pedal 29a.

Figure 2:
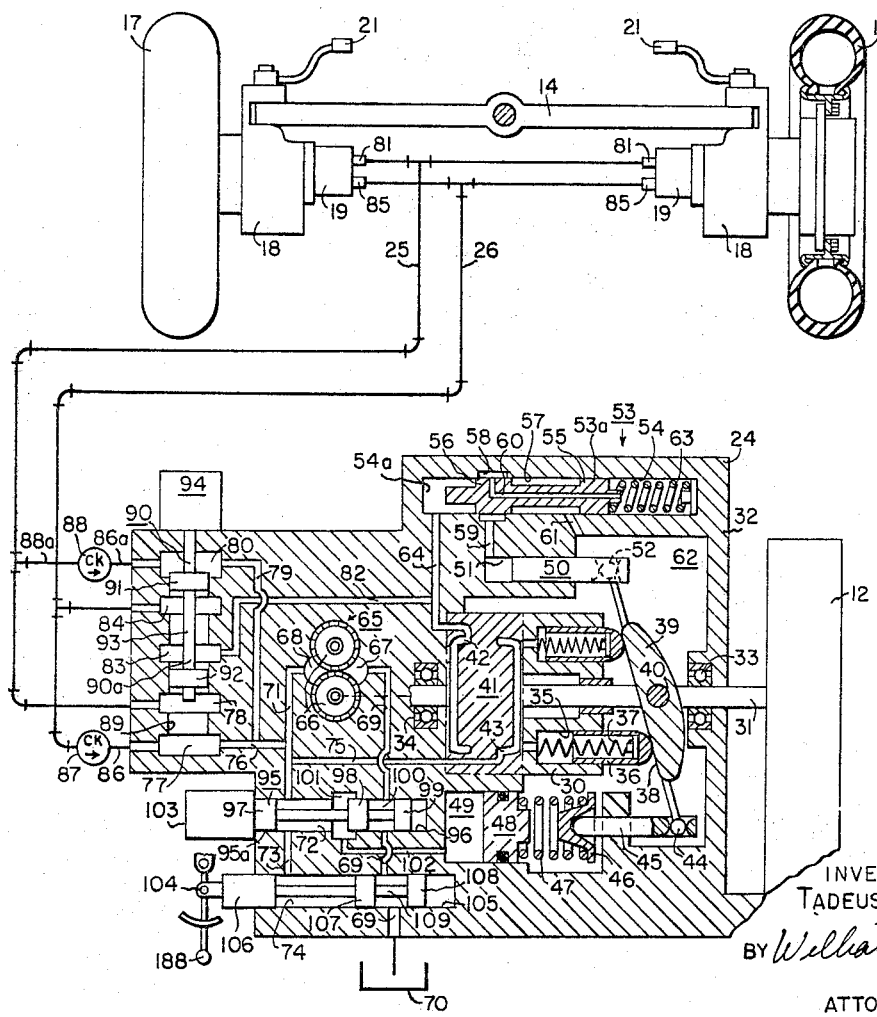
FIG. 2 is a schematic, and partially diagrammatic, representation of the fluid drive components with variable pump and pump control components including reversing drive controls utilized in this invention.

Referring now to FIG. 2, the various components of the variable flow pump 24 are somewhat diagrammatically shown. The pump 24 includes a cylinder barrel 30 to which rotary motion is transmitted from the engine 12 by a shaft 31, journalled in pump housing 32 by bearings 33 and 34. The cylinder barrel 30 has a plurality of cylinder bores 35, slidably guiding pistons 36 which, under the action of piston return springs 37, abut reaction surface 38 of a trunnion 39. The trunnion 39 is mounted for limited rotation or tilting, in respect to pump housing 32, by trunnion pins 40. The cylinder barrel 30 abuts diagrammatically shown valve plate 41, which contains a high pressure timing port 42 and a low pressure timing port 43. The trunnion 39 has a first part spherical extension 44, universally engaging spring guide 45 which in turn universally mounts spring retainer 46. A control spring 47 is interposed between spring retainer 46 and an unloading piston 48, which is guided, slidably, in an unloading cylinder 49. The control spring 47, through spring guide 45 and first spherical extension 44, biases the trunnion 39 toward the position of maximum angular inclination in respect to the axis of rotation of the shaft 31. A control piston 50, slidably retained in a control cylinder 51, universally engages a second spherical extension 52 of the trunnion 39. The pump 24 is provided with a pump control designated generally as 53, which includes a control spool 53a slidably guided in a control bore 54. The control spool 53a is provided with a pair of lands 55 and 56, defining therebetween an annular space 57. An annular groove 58 circumscribes the control bore 54 and is connected through passage 59 with the control cylinder 51 and through passage 60 with control bore 54. Annular space 57 is connected through drilling 61 with space 62, defined by the pump housing 32. A control spool spring 63 is interposed between pump housing 32 and control spool 53. The control bore 54, in the zone adjacent to land 56, is connected through passage 64 with the pump high pressure port 42.

A fixed displacement gear pump designated generally as 65 and having pumping gears 66, is drivingly connected to shaft 31 by a connection (not shown). The gear pump has an inlet port 67 and an outlet port 68. The inlet port 67 is connected through passage 69 with diagrammatically shown reservoir 70. The outlet port 68 is connected through passage 71 with annular space 72, through passage 73 with annular space 74, and through passage 75 with the low pressure port 43. The outlet port 68 of the gear pump is also connected through passage 76 with annular grooves 77 and 78, and through passage 79 with annular groove 80. The annular groove 78, and therefore outlet port 68, is connected through flexible duct 25 to the low pressure ports 81 of fluid motors 19. The high pressure timing port 42 is connected through passage 82 with annular groove 83 and with annular groove 84 which, in turn, is connected through the flexible duct 26 to high pressure ports 85 of the fluid motors 19. Annular groove 77 is connected through duct 86 and check valve 87 with the flexible duct 26. The annular groove 80 is connected through duct 86a, check valve 88 and duct 88a to the flexible duct 25. The annular grooves 80, 84, 83, 78 and 77, functionally interconnected by a cylindrical bore 89, constitute timing ports of a four-way valve 90 having a spool 90a. The spool 90a is provided with lands 91 and 92, connected by spool stem 93. The spool 90a is connected to a solenoid 94. An unloading valve 95 is provided which has a spool 95a guided in a valve bore 96, the spool 95a being equipped with lands 97, 98 and 99. Annular space 72 is defined between lands 97 and 98, and lands 98 and 99 define an annular space 100 therebetween. Annular space 72, communicating with annular groove 101, is connected through passage 102 with the unloading cylinder 49. The unloading valve spool 95a is connected to solenoid 103. A selector valve spool 104 is provided which is slidably guided in valve bore 105 and is equipped with lands 106, 107 and 108. Annular space 74 is defined by lands 106 and 107, and lands 107 and 108 define an annular space 109 therebetween.

Figure 3:
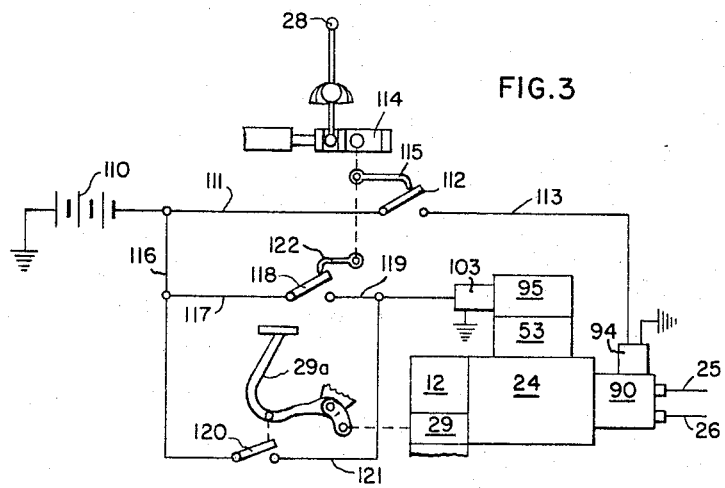
FIG. 3 is a diagrammatic representation of electrical control circuit of this invention utilized in synchronizing the mechanical transmission controls of the tractor with the front wheel fluid drive.

Referring now to FIG. 3, the basic pump and control components, shown in greater detail in FIG. 2, are shown schematically. The engine 12 drives the variable flow pump 24, which is equipped with an automatic pressure responsive pump control 53. The unloading valve 95 of the automatic pressure responsive pump control 53 is operated by solenoid 103. The reversing four-way valve 90, operated by solenoid 94, is interposed between the variable flow pump 24 and flexible ducts 25 and 26. The tractor is provided with a battery 110 which is disposed to be connected through conductor 111, normally open switch 112 and conductor 113, with solenoid 94 of the reversing four-way valve 90. The gear shift lever 28, at selective positions equivalent to reverse drive positions, closes the switch 112 through lever mechanism 114, connecting the battery 110 to the solenoid 94. The battery 110 is also disposed to be connected to solenoid 103 of unloading valve 95, through conductors 116 and 117, normally open switch 118, conductor 119, normally open switch 120 and conductor 121. The gear shift lever 28 at appropriate position, i.e., equivalent to neutral drive position, closes switch 118 through lever mechanism 122, connecting battery 110 with solenoid 103. The clutch pedal 29a, functionally connected to tractor clutch 29, at position equivalent to declutched condition, with engine disconnected from the driving wheels, actuates normally open switch 120 to connect the battery 110 with solenoid 103.

Figure 4:
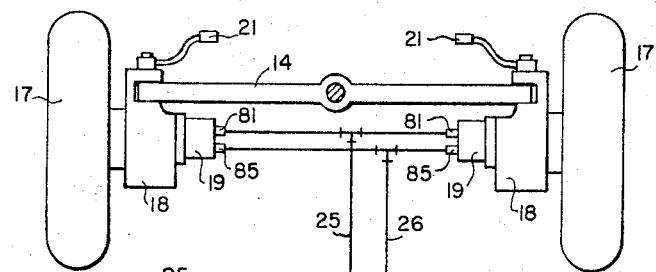
FIG. 4 is a diagrammatic representation of a pneumatic control circuit according to this invention for synchronizing mechanical transmission controls of a tractor with the front wheel fluid drive.
Figure 4:
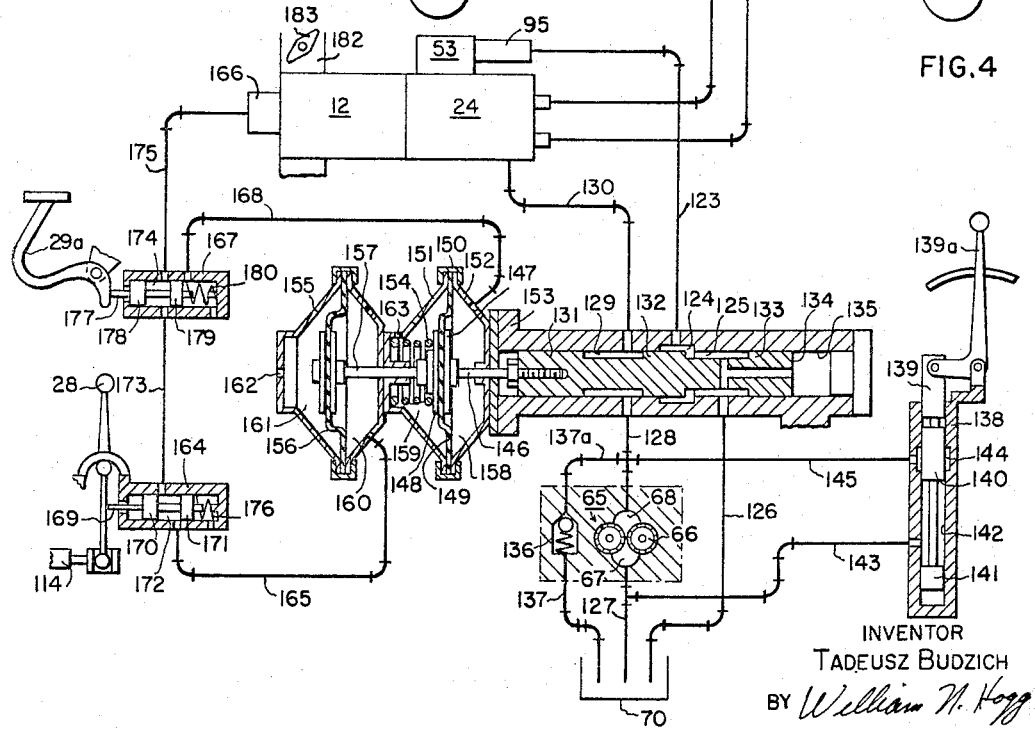

Referring now to FIG. 4, schematically shown variable displacement pump 24, driven by engine 12, is connected through flexible ducts 25 and 26 with fluid motors 19 drivingly connected to tractor front wheels 17. The variable flow pump 24 is equipped with automatic pressure responsive control 53, which includes the unloading valve 95. The fluid actuated unloading valve 95 is selectively connected through duct 123, annular groove 124, annular space 125 and passage 126 with the low pressure reservoir 70. The inlet port 67 of the gear pump 65 is connected through line 127 to reservoir 70, and the outlet port 68 is connected through line 128 with annular space 129 and through line 130 with low pressure timing port 43 (not shown in this figure) of the variable pump 24. The annular spaces 125 and 129 are defined respectively by lands 131 and 132, and 132 and 133 of valve spool 134, slidably guided in valve bore 135. The line 128, connected to the outlet port 68 of the gear pump 65, is functionally interconnected, through conventional relief valve 136 and line 137, with reservoir 70. A selector valve, generally designated as 138, is provided and includes a valve spool 139 having lands 140 and 141 defining therebetween annular space 142. The annular space 142 communicates through line 143 with the inlet port 67 of the pump 65. Annular groove 144, circumscribing the valve spool 139, communicates through fluid line 145 with the outlet port 68 of the pump 65. The selector valve spool 139 is actuated by control lever 139a. The valve spool 134 is connected through a stem 146 and washers 147 and 148 with diaphragm 149 of a pneumatic actuator, generally designated as 150. The diaphragm 149 is suitably clamped between mating shells 151 and 152. The shell 152 is secured as by a weld, (not shown) to valve body 153, containing valve bore 135. An actuating spring 154 is interposed between the shell 151 and washer 148 of the pneumatic actuator 150. A second pneumatic actuator, generally designated as 155, of similar construction as the pneumatic actuator 150, is secured, as by a weld (not shown) to the shell 151 of actuator 150. The second pneumatic actuator 155 includes a diaphragm 156 connected by stem 157 to washer 148 and is therefore functionally connected by stem 146 to the valve spool 134. The diaphragm 149 divides the pneumatic actuator 150 into two functional zones 158 and 159, and the diaphragm 156 functionally divides second pneumatic actuator 155 into two functional zones 160 and 161. Zone 161 and zone 159 are vented to atmosphere by openings 162 and 163, respectively. The zone 160 can be selectively connected by first actuating valve 164 and pneumatic line 165 with a source of pneumatic pressure 166 (preferably generated by engine 12) and with atmospheric pressure. The zone 158 can be selectively connected by second actuating valve 167 and pneumatic line 168 with the source of pneumatic pressure 166 or atmospheric pressure. The first actuating valve 164 includes a spool 169 equipped with lands 170 and 171 defining therebetween annular space 172. The annular space 172 is in communication through line 165 with zone 160 of the second pneumatic actuator 155, and is connected through line 173 with the second actuating valve 167. The spool 169 is biased toward engagement with gear shift lever 28 by spring 176. The second actuating valve 167 includes a spool 177 having lands 178 and 179 defining therebetween an annular space 174. Spring 180 biases the spool 177 toward engagement with clutch pedal 29a. The annular space 174 is connected to line 173 and communicates through pneumatic line 175 with the source of pneumatic pressure 166.

FIG. 5 shows a control arrangement, similar to that shown in FIG. 4, with the exception that vacuum instead of pneumatic pressure is used to control movement of spool 134. The first actuating valve 164 and second actuating valve 167 are connected through lines 173 and 181 to a vacuum zone 182, created preferably by throttle valve 183, of the engine 12. The second actuating valve 167 is connected through line 184 with zone 159 of actuator 150. The zone 158 of actuator 150 is vented to atmosphere through opening 185. The first actuating valve 164 is connected through line 186 with zone 161 of second pneumatic actuator 155. Zone 160 of second pneumatic actuator 155 is vented to atmosphere by opening 187. All the other connections and components of fluid drive and drive controls of FIG. 5 are identical to those as already described in FIG. 4.

*Operation*

Referring now to FIG. 2, the rotary motion generated by the engine 12 is transmitted to cylinder barrel 30 and induces reciprocation in pistons 36, which follow inclined reaction surface 38 of trunnion 39. This reciprocating motion will induce pumping action which, in a well-known manner, is phased with high pressure timing port 42 and low pressure timing port 43 of diagrammatically shown valve plate 41. The magnitude of pressure flow generated within cylinder barrel 30 is proportional to the angle of inclination of the reaction surface 38, of trunnion 39 in respect to axis of rotation of shaft 31. With reaction surface 38 normal to the axis of rotation of the pump, the pump flow becomes zero. With the maximum angle of inclination of reaction surface 38, as shown in FIG. 2, the pump volume output is at its maximum. The high pressure fluid from the high pressure timing port 42 is transmitted through passage 82, annular groove 83, cylindrical bore 89, annular groove 84 and flexible duct 26 to the high pressure ports 85 of the fluid motors 19. The flow of high pressure fluid will induce rotation in the fluid motors 19. This rotation is transmitted through the respective mechanical gear reductions 18 to the respective tractor front wheels 17. The high pressure fluid, after performing its work in the fluid motors 19, is exhausted at a reduced or low pressure level, from low pressure ports 81, and is returned through flexible duct 25, annular groove 78, cylindrical bore 89, annular groove 77 and passages 76 and 75, to low pressure timing port 43. The speed of rotation of the front wheels 17 is dictated by the surface speed of the tractor, which, in turn, is dictated by speed of rotation of the rear wheels 15 (see FIG. 1). The tractor is driven by the rear wheels 15 connected through the mechanical transmission 16 with engine 12. The driving ratio of the mechanical transmission 16 is dictated by the selected position of the gear shift lever 28. Since most tractor transmissions are not what is commonly referred to as "synchronized," the change in mechanical driving ratio performed by gear shift lever 28 in combination with tractor clutch 29 and tractor clutch pedal 29a is usually performed with the tractor 10 stationary. The driving power, derived from the engine 12 by the variable flow pump 24 and supplied to the fluid motors 19, is transmitted to the steering wheels 17 and helps to propel the tractor 10. The speed of rotation of the steering wheels 17 is dictated by the speed of rotation of the rear wheels 15. Both the rear wheels 15 and steering wheels 17 are functionally synchronized by the ground surface. Therefore, the higher the surface speed of the tractor, the higher the speed of rotation of the steering wheels 17 and the larger the flow of high pressure fluid required by the fluid motors 19. Since the fluid is supplied to the motors 19 by the variable flow pump 24, the volume output of the pump must vary proportionally with the surface speed of the tractor 10. The magnitude of the torque transmitted to the steering wheels 17 is proportional to the fluid pressure developed by the variable flow pump 24. Referring back, now, to FIG. 2, the angle of inclination of trunnion 39, and therefore the volume output of the pump, is regulated by the combined action of control spring 47, control piston 50 and the automatic pressure responsive pump control 53. The control spring 47, acting through spring guide 45 and first spherical extension 44, biases the trunnion 39 toward the position equivalent to maximum flow of the pump. The pressure signal, supplied from automatic pressure responsive control 53 to control cylinder 51, will react on the cross section area of the control piston 50, generating a force proportional to the magnitude of the pressure signal. This force, transmitted through the second spherical extension 52, tends to overcome the bias of the control spring 47 and to rotate the trunnion 39 around trunnion pin 40 toward the position of zero pump displacement. The automatic pressure responsive control 53 is arranged to supply a modulated control signal, which will vary the angle of inclination of the trunnion 39 and therefore volume output of the pump, to maintain a relatively constant high pressure in the high pressure timing port 42. This pressure will remain relatively constant in the range of pump flows, varying from maximum to minimum as dictated by the surface speed of the tractor. The fluid under pressure is conducted from high pressure timing port 42 through passage 64 to the portion of control bore 54a where, reacting on the cross section area of land 56, it opposes the bias-force of the control spool spring 63. The lands 56 and 55, of the control spool 53a, define annular space 57 connected through drilling 61 with low pressure space 62 within the pump 24. Movement of the control spool 53a in either direction from position, as shown in FIG. 2, will either connect annular groove 58, and therefore control cylinder 51 through passage 59, with high or low pressure. Increasing pressure in portion 54a of the control bore will overcome the bias of the control spool spring 63 and connect high pressure fluid to control cylinder 51, rotating the trunnion 39 toward position of reduced pump flow. Conversely, reduction in the pressure in high pressure timing slot 42, which will be accompanied by a corresponding reduction in portion 54a of the control bore, will permit the bias of the control spool spring 63 to move control spool 53 toward the portion 54a, connecting control cylinder 51 with the low pressure space 62. Under action of control spring 47, the trunnion 39 will be rotated toward the position of increased pump flow. Control of this type is well known in the art and is not the subject of this invention. In general, a variable displacement pump, as shown in FIG. 2, equipped with this type of control, will supply a constant preselected pressure and exact volume of high pressure fluid to the fluid motors, as required by the rotation of the steering wheels 17 and therefore the surface speed of the tractor 10. The control pressure level of the transmission is dictated by the magnitude of the preload of the control spool spring 63 in its equilibrium position, as shown in FIG. 2. The rotation of the shaft 31 is transmitted through a mechanical connection, not shown, to gears 65 and 66, of a conventional gear pump. This gear pump, in a well-known manner, will generate flow of pressure fluid. It is assumed that the direction of rotation of the gear pump is such that the outlet port 68 will be the increased pressure port, and that inlet port 67 will be the low pressure suction port of the pump 65. The fluid under pressure from outlet port 68 is transmitted through passage 71, annular space 72, annular groove 101 and passage 102 to unloading cylinder 49, where it reacts on cross section area of the unloading piston 48. The pressure generated by the gear pump in outlet port 68 is so-selected as to permit unloading piston 48 to compress control spring 47. The low pressure inlet port 67, of fixed displacement pump, is connected through passage 69 to annular space 100, defined between the lands 98 and 99 of the unloading valve spool 95a. The unloading valve spool 95a is connected to solenoid 103. Movement of the unloading valve spool 95a toward the solenoid 103 will cause land 98 to block pressure fluid from outlet port 68 and connect unloading cylinder 49 to the low pressure inlet port 67 through passages 69 and 102. Under action of the control spring 47 and piston return springs 37, the unloading piston 48 will move toward the closed end of cylinder 49, bringing the trunnion 39 into zero flow position. Movement of the unloading valve spool 95a back to position, as shown in FIG. 2, will reconnect the pressure fluid from outlet port 68 to unloading cylinder 49. Unloading piston 48 will move away from the closed end of cylinder 49, compressing control spring 47 and activating the control mechanism of the variable displacement pump and therefore activating the front wheel fluid drive. In the normal driving position, the unloading valve spool 95a remains as shown in FIG. 2, and an electrical signal to the solenoid 103 will unload variable flow pump 24.

The selector valve spool 104, which is slidably guided in the selector valve bore 105, is manually operable by the unloading lever 188. The outlet port 68 of the gear pump 65 is connected through passage 71, annular space 72 and passage 73, to annular space 74, which is defined between lands 107 and 106. The low pressure inlet port 67 of the gear pump is connected through passage 69, annular space 100 and passage 69a to annular space 109 defined between the lands 107 and 108, annular space 109 being also connected by passage 69 to reservoir 70. Movement of the selector valve spool 104 toward the closed end of bore 105 will functionally interconnect, by annular space 74, outlet port 68 and inlet port 67 of fixed displacement pump 65, thus making the fixed displacement pump inactive. Loss of pressure in outlet port 68 and therefore in unloading cylinder 49 will automatically unload the pump control movement of the piston 48 toward the closed end of cylinder 49, which will move the trunnion to zero flow position, irrespective of the position of unloading valve spool 95a. In this way, by a control signal supplied to solenoid 103, the fluid drive can be unloaded or activated at will, with selector valve spool 104 remaining in the position as shown in FIG. 2, but with the selector valve spool 104 in an unloaded position the pump will remain unloaded irrespective of action of the solenoid 103.

The high pressure timing port 42, as shown in FIG. 2, is connected with the flexible duct 26 by passage 82, annular groove 83, cylindrical bore 89 and annular ring 84. The low pressure timing port 43 is connected to flexible duct 25 through passages 75 and 76, annular groove 77, cylindrical bore 89 and annular groove 78. In this way the pressure fluid flows from high pressure timing port 42 through flexible duct 26, fluid motors 19 and through flexible duct 25, at low pressure, returns to low pressure timing port 43. Fluid leaving the pump and returning passes through the passages of a conventional four-way valve, generally designated as 90, having four-way valve spool 90a operable by solenoid 94. In a well-known manner, movement of the spool 90a away from solenoid 94, under action of solenoid 94, from the position as shown in FIG. 2, will connect high pressure timing port 42 with flexible duct 25, connecting flexible duct 26 with low pressure timing port 43. Since the direction of flow of fluid in the flexible ducts 25 and 26 will be reversed, the direction of rotation of the tractor front wheels 17 will also be reversed. Therefore, actuation of the solenoid 94 will reverse direction of rotation of the tractor front wheels 17. The annular grooves 77 and 80 remain at all times in direct communication with the low pressure timing port 43. The annular groove 77 is functionally connected through duct 86 and check valve 87 to flexible duct 26. The annular groove 80 is functionally connected through duct 86a, check valve 88 and duct 88a to flexible duct 26. In the case of a tractor travelling in forward or reverse, either of the flexible ducts 25 or 26 can be subjected to high pressure fluid. In either case the check valves 88 and 87 will remain closed, in a well-known manner, preventing the flow of pressure fluid to low pressure timing port 43. However, if the speed of rotation of front wheels 17 should exceed the maximum capacity of the variable flow pump 24 under driving conditions, as shown in FIG. 2, flexible duct 26 would be subjected to negative pressure, resulting in opening of the check valve 87. The flow of the pump would then be supplemented by cross-circulation between flexible ducts 25 and 26. The additional oil would then flow directly from flexible duct 25 through annular groove 78, cylindrical bore 89, annular ring 77, duct 86 and check valve 87 to flexible duct 26. With flow reversed and with the speed of fluid motors 19 exceeding the maximum flow potential of the variable flow pump, the check valve 88 would open, the cross-circulation between the flexible ducts 26 and 25 taking place in similar manner as described when referring to over-speed conditions in four-way drive.

Referring now to FIG. 3, the integration of the fluid drive controls with conventional tractor mechanical transmission drive controls using electrical synchronizing circuit, is shown. As already has been described in connection with the operation of the pump control circuit of FIG. 2, the fluid drive, employing the above combination of controls, is characterized by a continuous uninterrupted transmission of torque to the front wheels, and, as already described, this driving torque must be disconnected while shifting gears and when the mechanical transmission is in neutral. FIG. 3 shows a synchronizing mechanism, which, by sensing the selective positions of the tractor gear shift lever and the tractor clutch pedal, will selectively connect, disconnect, or, if required, put it into reverse drive condition. The unloading valve solenoid 103, unloading valve 95, pressure responsive pump control 53, pump 24, reversing valve 90 and reversing valve solenoid 94 of FIG. 2 are shown schematically. The part of the drive circuit and front axle is not shown, and the flexible ducts 25 and 26 supplying fluid to the fluid motors of FIG. 2 are not shown in FIG. 3. Referring now to the reversing circuit portion of FIG. 3, actuation of electrical switch 112 will connect battery 110 through conductors 111 and 113 to reversing solenoid 94, and in a manner as previously described will reverse the polarity of flexible ducts 25 and 26 and effectively reverse the direction of rotation of the fluid motors. The switch 112 is actuated by mechanism 115, which is responsive to a selective position of gear shift lever 28 equivalent to transmission shifted into reverse gear or gears. The mechanism 115 is shown schematically and is of the lost-motion type, well known in the art. This mechanism is so-arranged that only when gear shift lever 28 is shifted into reverse gear position is the switch 112 closed, thereby causing solenoid 94, through reversing valve 90, to reverse the direction of rotation of the fluid front wheel drive.

The actuation of the solenoid 103, and therefore unloading of the pump control, can be accomplished by either closing switch 118 or switch 120 and effectively connecting, in each case, the source of electrical energy 110 with solenoid 103. The switch 118 is actuated through mechanism 122 of the lost-motion type. This mechanism is so-arranged that only with gear shift lever 28 in neutral position, and therefore with driving wheels of the tractor disconnected from the engine, will the switch 118 be closed. In this way, with gear shift lever 28 in neutral, variable flow pump 24, through solenoid 103, unloading valve 95 and pump automatic pressure responsive controls 53, will be brought into minimum pressure and zero flow condition, thus effectively unloading the fluid drive. The switch 120 is actuated by tractor clutch pedal 29a and becomes closed only when the clutch 29 disconnects the tractor engine from the mechanical transmission and driving wheels. Therefore, in the same manner as already described, when referring to neutral position of the mechanical tractor drive, actuation of the clutch 29 will bring the variable flow pump 24 into condition of minimum pressure and zero flow, thus effectively unloading fluid drive. In the present invention, since gear shift lever 28 can only be moved with previous actuation of clutch 29 which automatically unloads the front wheel drive, shifting of the gear shift lever 28 into reverse, and therefore reversing of the fluid drive by solenoid 94 and reversing valve 90, can only take place with the fluid transmission in its unloaded condition of zero pump flow. In this way an ideal condition of reversing of the fluid drive is achieved, completely eliminating the shock resulting from operation of the reversing valve at positive pump flows.

Referring now to FIG. 4, another type of synchronizing mechanism between the tractor mechanical transmission controls and fluid drive controls is shown. The mechanism of FIG. 4 does not show the reversing feature for clarity of illustration, although the reversing valve could be integrated into the control circuit, in a similar way as shown in FIG. 3, as is obvious to one skilled in the art. The automatic pressure responsive pump control 53 is unloaded by valve spool 134 in a manner similar to that described when referring to operation of unloading valve 95 of FIG. 2. In position, as shown in FIG. 4, the reservoir 70 is connected through passage 126, annular space 125, annular ring 124 and duct 123 with unloading cylinder 49 of FIG. 2. As previously described, under those conditions the variable flow pump becomes unloaded. Movement of valve spool 134 in a direction away from actuator 150 will close off annular groove 124 from reservoir 70 and connect it through annular space 129 and line 128 with the outlet port 68 of the gear pump 65. Fluid under pressure from outlet port 68 will then be supplied through duct 123 to unloading cylinder 49 (shown in FIG. 2), effectively activating the pump control. A conventional relief valve 136 is connected by lines 137 and 137a between the outlet port 68 of the gear pump 65 and reservoir 70, which, in a well-known manner, will bypass excess flow of pressure fluid from outlet port 68 to reservoir 70 while maintaining the outlet port 68 at a relatively constant pressure. Therefore, the movement of the valve spool 134 will either unload or activate the variable flow pump 24. The operation of the selector valve 138 of FIG. 4 is similar to operation of the selector valve operated by lever 188 of FIG. 2. As shown in FIG. 4, the line 145 communicating with outlet port 68 is connected to annular groove 144. The inlet port 67 is connected through line 143 with annular space 142. The land 140 of the selector valve spool 139 effectively blocks intercommunication between annular groove 144 and annular space 142. Movement of the control lever 139a clockwise, as shown in FIG. 4, will move selector valve spool 139 in a direction to connect annular groove 144 with annular space 142 and therefore effectively short circuit outlet port 68 and inlet port 67 of the fixed displacement pump. With ports 68 and 67 short circuited, the fixed displacement pump will not generate pressure, and therefore, irrespective of the position of valve spool 134, variable flow pump 24 will become unloaded and remain in unloaded position due to unloading of unloading piston 48 as previously explained. The valve spool 134 is actuated by dual pneumatic actuators 150 and 155 equipped with diaphragms 149 and 156, respectively. The diaphragms of the pneumatic actuators are rigidly connected with valve spool 134 by stems 146 and 157. Actuating spring 154 biases the valve spool 134 toward position, equivalent to active or loaded condition of the variable pump control. A compressor 166, driven by the engine 12, supplies compressed air to the first and second actuating valves 164 and 167 through lines 175 and 173. The spool 169 of first actuating valve 164 is moved into position as shown in FIG. 4 by gear shift lever 28 in neutral position. Then spool 170 connects compressed air from line 173 to line 165 and zone 160, displacing the diaphragm 156 toward actuator 150, compressing actuating spring 154 and moving valve spool 134 into its unloading position as shown in FIG. 4. Shifting of gear shift lever 28 from its neutral position into any other drive position will permit the spool 169 of first actuating valve 164 to move into a position, as shown in second actuating valve 167, connecting the line 165 and zone 160 to atmosphere. Under action of actuating spring 154 the valve spool 134 will move into the position equivalent to active operation of pump control 53 and pump 24. In a similar manner the second actuating valve 167 is connected by line 168 with the zone 158 of first pneumatic actuator 150. The position of the spool 177 permits venting the zone 158 with atmosphere. When depressing clutch pedal 29a, the spool 177 will be moved against the bias of spring 180, connecting line 168, and therefore zone 158, with the source of compressed air, thus, in a manner previously described, through diaphragm 149 compressing actuating spring 154 and bringing the valve spool 134 into condition equivalent to the variable pump being inactive or unloaded. Therefore, by depressing the clutch pedal 29a or by moving the gear shift lever 28 into neutral position, the variable displacement pump 24 will become unloaded, effectively disconnecting the power from the fluid drive.

Referring now to FIG. 5, a similar control mechanism to that of FIG. 4, for performing the same functions, is shown. The actuators 150 and 155 are not operated by compressed air, as in the configuration shown in FIG. 4, but by vacuum derived from engine manifold 182, created by the conventional carburetor throttling valve 183. The first and second actuating valves are of identical construction as shown in FIG. 4. The line 184 connects second actuating valve 167 with the zone 159 of actuator 150. The first actuating valve 164 is connected by line 186 to zone 161 of second actuator 155. Movement of the clutch pedal 29a from position, as shown, will connect, in a manner as previously described, zone 159 of actuator 150 with the source of vacuum. The diaphragm will then compress the spring and move valve spool 134 into position equivalent to unloading condition of the variable flow pump. In a similar manner, bringing the gear shift lever 28 into neutral position will connect zone 161 with the source of vacuum, unloading the variable displacement pump. In this way, actuation of the clutch pedal 29a and bringing the gear shift lever 28 into neutral, will unload the fluid drive, permitting shifting of the gears or parking of the vehicle, without application of the brakes.

I claim:

1. In a self-propelled vehicle having a frame, an engine and driving wheels mounted on said frame, transmission means interposed between said driving wheels and said engine, shift means arranged to change the driving ratio of said transmission means, mechanical clutch means interposed between said transmission means and said engine, said mechanical clutch means having mechanical activating means to selectively disconnect said engine from said transmission means, at least one steering wheel pivotally mounted on said frame, the combination therewith of a fluid power transmission and control system disposed to drive said steering wheels comprising, fluid motor means mounted on said steering wheels and drivingly engaged therewith, a variable flow pump disposed to drive said fluid motor means, pressure responsive control means to vary the flow of said pump to maintain a relatively constant system pressure, unloading means disposed to selectively unload said pressure responsive control means and bring said pump into condition of minimum flow and pressure, means to actuate said unloading means, control means interposed between and functionally interconnecting said means to actuate said unloading means and said mechanical clutch actuating means and responsive to selective positions of said mechanical clutch actuating means, whereby selective positions of said mechanical clutch actuating means will unload said fluid power transmission and control system.

2. In a self-propelled vehicle having a frame, an engine and driving wheels mounted on said frame, transmission means interposed between said driving wheels and said engine, shift means arranged to change the driving ratio of said transmission means, mechanical clutch means interposed between said transmission means and said engine, said mechanical clutch means having mechanical activating means to selectively disconnect said engine from said transmission means, at least one steering wheel pivotally mounted on said frame, the combination therewith of a fluid power transmission and control system disposed to drive said steering wheels comprising, fluid motor means mounted on said steering wheels and drivingly engaged therewith, a variable flow pump disposed to drive said fluid motor means, pressure responsive control means to vary the flow of said pump to maintain a relatively constant system pressure, unloading means disposed to selectively unload said pressure responsive control means and bring said pump into condition of minimum flow and pressure, means to actuate said unloading means, control means interposed between and functionally interconnecting said means to actuate said unloading means and said shift means and responsive to selective positions of said shift means, whereby selective positions of said shift means will unload said fluid power transmission and control system.

3. In a self-propelled vehicle having a frame, an engine and driving wheels mounted on said frame, transmission means interposed between said driving wheels and said engine, shift means arranged to change the driving ratio of said transmission means, mechanical clutch means interposed between said transmission means and said engine, said mechanical clutch means having mechanical activating means to selectively disconnect said engine from said transmission means, at least one steering wheel pivotally mounted on said frame, the combination therewith of a fluid power transmission and control system disposed to drive said steering wheels comprising, fluid motor means mounted on said steering wheels and drivingly engaged therewith, a variable flow pump disposed to drive said fluid motor means, pressure responsive control means to vary the flow of said pump to maintain a relatively constant system pressure, unloading means disposed to selectively unload said pressure responsive control means and bring said pump into condition of minimum flow and pressure, means to actuate said unloading means, first control means interposed between and functionally interconnecting said means to actuate said unloading means and said shift means and responsive to selective positions of said shift means, second control means interposed between and functionally interconnecting said means to actuate said unloading means and said mechanical clutch actuating means and responsive to selective positions of said mechanical clutch actuating means, whereby selective positions of said shift means and said mechanical clutch actuating means will unload said fluid power transmission and control system.

4. In a self-propelled vehicle having a frame, an engine and driving wheels mounted on said frame, transmission means interposed between said driving wheels and said engine, shift means arranged to change the driving ratio of said transmission means, mechanical clutch means interposed between said transmission means and said engine, said mechanical clutch means having mechanical activating means to selectively disconnect said engine from said transmission means, at least one steering wheel pivotally mounted on said frame, the combination therewith of a fluid power transmission and control system disposed to drive said steering wheel comprising, fluid motor means mounted on said steering wheels and drivingly engaged therewith, a variable flow pump disposed to drive said fluid motor means, pressure responsive control means to vary the flow of said pump to maintain a relatively constant system pressure, unloading means disposed to selectively unload said pressure responsive control means and bring said pump into condition of minimum flow and pressure, source of control pressure to operate said unloading means, selector valve means, duct means interconnecting said source of control pressure, said selector valve means and said unloading means, first control means interposed between and functionally interconnecting said selector valve means and said shift means and responsive to selective positions of said shift means, second control means interposed between and functionally interconnecting said selector valve means and said mechanical clutch actuating means and responsive to selective positions of said mechanical clutch actuating means, whereby selective positions of said shift means and said mechanical clutch actuating means will unload said fluid power transmission and control system.

5. The combination of claim 4 further characterized by a first solenoid disposed to operate said selector valve means, said first and second control means including an electrical switch, a source of electrical power, and current conducting means connecting said source of electrical power, said electrical switch, said solenoid and said second control means in circuit relationship.

6. In a self-propelled vehicle having a frame, an engine and driving wheels mounted on said frame, transmission means interposed between said driving wheels and said engine, shift means arranged to change the driving ratio of said transmission means, mechanical clutch means interposed between said transmission means and said engine, said mechanical clutch means having mechanical activating means to selectively disconnect said engine from said transmission means, steering wheels pivotally mounted on said frame, the combination therewith of a fluid power transmission and control system disposed to drive said steering wheels comprising, fluid motors mounted on said steering wheels and drivingly engaged therewith, a variable flow pump driven by said engine and disposed to drive said fluid motors, pressure responsive control means to vary the flow of said pump to maintain a relatively constant system pressure, unloading means disposed to selectively unload said pressure responsive control means and bring said pump into condition of minimum flow and pressure, reversing valve means mounted on said variable flow pump and arranged to reverse direction of flow from said variable flow pump to said fluid motors, means to actuate said unloading means, first control means interposed between and functionally interconnecting said means to actuate said unloading means and said shift means and responsive to selective position of said shift means, second control means interposed between and functionally interconnecting said means to actuate said unloading means and said mechanical clutch actuating means and responsive to selective positions of said mechanical clutch actuating means, and third control means interposed between and functionally interconnecting said reversing valve means and said shift means and responsive to selective positions of said shift means whereby selective positions of said shift means and said mechanical clutch actuating means will control functions of said fluid power transmission system.

7. The combination of claim 4 further characterized by said source of control pressure having inlet and outlet ports, and mechanical control means arranged to selectively interconnect said outlet and inlet ports to lower the pressure of said source of control pressure whereby said variable flow pump can be selectively maintained unloaded irrespective of signals from said first and second control means.

8. The combination of claim 6 further characterized by a first solenoid, said control means including selector valve means operable by said first solenoid, said first and second control means including electrical signal transmitting means disposed to operate said first solenoid, a second solenoid disposed to operate said reversing valve means, said third control means including electrical signal transmitting means to operate said second solenoid.

9. In a self-propelled vehicle having a frame, an engine and driving wheels mounted on said frame, transmission means interposed between said driving wheels and said engine, shift means arranged to change the driving ratio of said transmission means, mechanical clutch means interposed between said transmission means and said engine, said mechanical clutch means having mechanical activating means to selectively disconnect said engine from said transmission means, steering wheels pivotally mounted on said frame, the combination therewith of a fluid power transmission and control system disposed to drive said steering wheels comprising, fluid motors mounted on said steering wheels and drivingly engaged therewith, a variable flow pump driven by said engine and disposed to drive said fluid motors, pressure responsive control mean to vary the flow of said pump to maintain a relatively constant system pressure, unloading means disposed to selectively unload said pressure responsive control means and bring said pump into condition of minimum flow and pressure, a source of control pressure to operate said unloading means, selector valve means, duct means interconnecting said source of control pressure, said selector valve means and said unloading means, first and second actuating means operatively connected to said selector valve means, first control means interposed between and functionally interconnecting said first actuating means and said shift means and responsive to selective positions of said shift means, second control means interposed between and functionally interconnecting said second actuating means and said mechanical clutch actuating means and responsive to selective positions of said mechanical clutch actuating means, whereby selective positions of said shift means and said mechanical clutch actuating means will activate said unloading means, bringing said variable flow pump into unloaded minimum power position and make the front wheel drive inactive.

10. The combination of claim 9 further characterized by said first and second actuating means including vacuum responsive means, and said first and second control means including vacuum valving means, source of vacuum, duct means between said source of vacuum and said first and second vacuum valving means and said first and second actuating means whereby said selector valve means will operate said unloading means.

11. The combination of claim 10 further characterized by said selector valve means and said first and second actuating means having spring means biasing said selector valve means toward position of activation of said variable flow fluid pump.

12. The combination of claim 9 further characterized by said first and second actuating means including fluid pressure responsive means, said first and second control means including fluid valving means, a source of fluid, first duct means between said source of fluid and said first and second fluid valving means, second duct means between said first and second fluid valving means and said first and second fluid actuating means whereby said selector valve means will be operated by said first and second control means.

References Cited by the Examiner

UNITED STATES PATENTS

| | | | |
|---|---|---|---|
| 2,547,578 | 4/1951 | Holmes | 180—66 |
| 2,741,989 | 4/1956 | Postel et al. | 60—53 X |
| 3,053,043 | 9/1962 | Knowler | 180—66 X |

FOREIGN PATENTS 791,903   3/1958   Great Britain.

BENJAMIN HERSH, *Primary Examiner.*

M. L. SMITH, *Assistant Examiner.*